(12) United States Patent
Poffet et al.

(10) Patent No.: US 9,694,524 B2
(45) Date of Patent: Jul. 4, 2017

(54) METHOD FOR MAKING AND DECORATING A TRANSPARENT TIMEPIECE COMPONENT

(71) Applicant: ETA SA MANUFACTURE HORLOGERE SUISSE, Grenchen (CH)

(72) Inventors: Christian Poffet, Giffers (CH); Philipp Gaechter, Itingen (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 418 days.

(21) Appl. No.: 14/349,487

(22) PCT Filed: Oct. 2, 2012

(86) PCT No.: PCT/EP2012/069470
§ 371 (c)(1),
(2) Date: Apr. 3, 2014

(87) PCT Pub. No.: WO2013/050371
PCT Pub. Date: Apr. 11, 2013

(65) Prior Publication Data
US 2014/0246806 A1 Sep. 4, 2014

(30) Foreign Application Priority Data
Oct. 4, 2011 (EP) .................................. 11183803

(51) Int. Cl.
*B29C 45/14* (2006.01)
*G04B 45/00* (2006.01)
(Continued)

(52) U.S. Cl.
CPC .... *B29C 45/14467* (2013.01); *B29C 45/0084* (2013.01); *B29C 45/14* (2013.01);
(Continued)

(58) Field of Classification Search
CPC .. B29C 2045/0075; B29C 2045/14696; B29C 2045/14713; B29C 45/14688;
(Continued)

(56) References Cited

U.S. PATENT DOCUMENTS

| | | | | | |
|---|---|---|---|---|---|
| 3,504,063 | A | * | 3/1970 | Lemelson | ............ B23K 15/002 264/245 |
| 3,968,305 | A | * | 7/1976 | Oshima | ................. B29C 39/006 427/164 |

(Continued)

FOREIGN PATENT DOCUMENTS

| | | | | |
|---|---|---|---|---|
| DK | WO 03049929 A1 | * | 6/2003 | ............... B05D 7/02 |
| IT | WO 2005047989 A2 | * | 5/2005 | ............. G04B 19/18 |

(Continued)

OTHER PUBLICATIONS

International Search Report Issued Jan. 11, 2013 in PCT/EP12/069470 Filed Oct. 2, 2012.

*Primary Examiner* — William Bell
(74) *Attorney, Agent, or Firm* — Oblon, McClelland, Maier & Nuestand, L.L.P.

(57) ABSTRACT

A method for making and decorating top and bottom surfaces of a transparent timepiece component, the method including: depositing a first decoration on a male pattern; moving the male pattern, covered or not covered by a preform, into an injection chamber and injecting a transparent material therein to coat the male pattern to obtain a compound including the top face with the first decoration, on the bottom face; polymerizing the first compound in the injection chamber and then removing therefrom; depositing another material and/or second decoration in a cavity and held by gravity, and deposited on the top surface via a relative motion in the direction of gravity, to obtain a second compound.

12 Claims, 2 Drawing Sheets

(51) Int. Cl.
*G04D 1/00* (2006.01)
*G04D 3/06* (2006.01)
*G04B 19/12* (2006.01)
*B29C 45/00* (2006.01)

(52) U.S. Cl.
CPC ......... *G04B 19/12* (2013.01); *G04B 45/0076* (2013.01); *G04D 1/0071* (2013.01); *G04D 3/06* (2013.01); *B29C 2045/0075* (2013.01); *B29C 2045/14696* (2013.01); *B29C 2045/14713* (2013.01)

(58) Field of Classification Search
CPC .............. B29C 67/246; B29C 45/0084; B29C 45/14467; G04B 39/004; G04B 45/0076; G04B 19/12; G04B 45/0084
See application file for complete search history.

(56) References Cited

U.S. PATENT DOCUMENTS

2006/0118999 A1\* 6/2006 Cooper ............... B29C 37/0028
264/255
2010/0310697 A1 12/2010 Steinebrunner et al.

FOREIGN PATENT DOCUMENTS

| JP | 59 52626 | 3/1984 |
| JP | 63 135214 | 6/1988 |
| JP | 1 114405 | 5/1989 |

\* cited by examiner

METHOD FOR MAKING AND DECORATING A TRANSPARENT TIMEPIECE COMPONENT

CROSS-REFERENCE TO RELATED APPLICATIONS

This is a National Phase Application in the United States of International Patent Application PCT/EP 2012/069470 filed Oct. 2, 2012, which claims priority on European Patent Application No 11183803.3 filed Oct. 4, 2011, the entire contents of each of which are incorporated herein by reference.

FIELD OF THE INVENTION

The invention concerns a method for forming a transparent, one-piece timepiece component including a top surface and a bottom surface connected by an edge, said edge extending in the thickness of said component.

The invention also concerns the application of this method to the making of a timepiece component.

The invention also concerns a production unit for implementing this method.

The invention further concerns a timepiece movement including at least one timepiece component realised according to this method.

The invention further concerns a timepiece including at least one timepiece component realised according to this method.

BACKGROUND OF THE INVENTION

The substitution of transparent components of mineral origin with transparent components made of moulded plastic material provides a functional alternative at low production cost, and complete independence from certain supply sources of up-market transparent materials.

However, moulded transparent parts are, on the one hand, relatively thick since it is difficult to mould very thin parts with adequate reproducible quality. On the other hand, the wear resistance, and particularly scratch resistance of these known plastic materials is very mediocre. The use thereof for the external components of timepieces—the middle part of the case, bezel or crystal—is thus limited in time.

This low wear resistance also makes it impossible to produce components with sharp angles, which would become blunt too quickly over time on contact with the user, his clothes, and ordinary everyday objects.

It is useful, in horology, to have components having a high surface hardness, in particular for those external timepiece components, which are subject to stresses from the environment and the user. These components must also have certain physical properties of elasticity, rigidity or conversely flexibility, or particular optical properties, to enhance certain displays or components, or conversely to conceal certain parts of the timepiece.

JP Patent Application No 59052626A in the name of SUMITOMO describes the fabrication of an insulating case, wherein a synthetic resin body is first injection moulded on a rotating tool in a first position and then subjected to metal plasma sputtering in a second position of the tool, and finally undergoes another resin injection above the metal layer, on the opposite side to the basic body, in a third position of the rotating tool, opposite to the first position.

JP Patent Application 1114405A in the name of TIGERS POLYMER describes a similar system, where the metal is in the form of a film held by adhesive between two resin layers, the sequence being performed with a similar rotating tool.

US Patent Application No 2010/1310697A1 in the name of STEINEBRUNNER describes an injection moulding machine for producing a part in two injected polymer half shells, which are assembled to each other on the same machine. The machine includes an injection tool rotating in two opposite directions of rotation.

SUMMARY OF THE INVENTION

The invention proposes to implement a method for obtaining, in an economical manner and with high dimensional precision, transparent one-piece timepiece components.

More particularly, it is an object of the invention to produce a component of this type, with a higher surface hardness than that of the timepiece components usually obtained by moulding plastic materials.

A particular object is also to make external timepiece parts, which include sharp angles, for example with a facet cut or diamond cut, and are resistant to wear.

The invention therefore concerns a method for the production and decoration of a transparent timepiece component, and for the affixing of decorations on both sides of said component, on a top and a hollow bottom surface separated by the thickness of said component, characterized in that, in the following order:

in a first station, a first decoration is deposited on a male pattern;

there is moved into a second station, in an injection chamber complementary to said top surface, either said male pattern provided with said first decoration, or respectively said male pattern provided with said first decoration covered by a transparent preform in said first station or in an intermediate station between said first station and said second station, and a first transparent polymerisable material is injected throughout said injection chamber, so as to coat with said first material, either said male pattern provided with said first decoration, or respectively, said overmoulded male pattern provided with said first decoration covered by said preform, so as to obtain a first compound including said top face and including said first decoration on said hollow bottom face;

said first compound is allowed to polymerise in said injection chamber;

said first compound is removed from said injection chamber;

a third material and/or a second decoration is deposited in a cavity in a third station in which said third material and/or second decoration is held by gravity;

in a third station, said third material and/or second decoration is deposited on said top face of said first compound by a relative motion between said cavity and said third station in the direction of gravity, so as to obtain a second compound;

in said third station it is waited until said second compound is handleable;

said second compound is removed from said third station.

According to a feature of the invention, after the removal of said second compound from said third station, in a fourth station, a third decoration is deposited on said top face of said second compound or in superposition on said third material and/or second decoration.

According to a feature of the invention, a model composition is used for said first material which includes, as a proportion of the total:

trimethylolpropane tri (methacrylate): 78.0%
pentaerythrityl tetraacrylate: 19.5%
bis(4-tert-butylcyclohexyl) peroxydicarbonate: 0.5%
1-benzoylcyclohexanol: 2.0%,
or the material Cover Form® material by Evonik Rohm® is used for said first material.

According to a feature of the invention, said preform is made in a first preform material formed by a material from the acrylic polymer family, or having said model composition, or formed by the Cover Form® material by Evonik Rohm®, or by methyl polymethacrylate.

According to the invention, said first material is injected into said injection chamber through an injection and degassing capillary network.

According to a feature of the invention, the polymerisation of said first compound is accompanied in said injection chamber with a heat treatment between 100° C. and 120° C. for 10 to 20 seconds, and/or irradiation by ultraviolet radiation.

According to a feature of the invention, electrifiable or magnetisable or electrified or magnetised particles are incorporated in said first decoration.

According to a feature of the invention, electrifiable or magnetisable or electrified or magnetised particles are incorporated in said third material and/or said second decoration.

According to a feature of the invention, said first material and/or said second decoration is made with electrifiable or magnetisable or electrified or magnetised particles.

According to a feature of the invention, electrifiable or magnetisable or electrified or magnetised particles are incorporated in said third decoration.

The invention also concerns a production unit for implementing this method, characterized in that at least a first station, at least a second station, at least a third station, are distributed in sequence in that order, around a rotating tool carrying at least as many male patterns as there are stations.

The invention further concerns a timepiece movement including at least one timepiece component realised according to this method.

The invention further concerns a timepiece including at least one timepiece component realised according to this method.

BRIEF DESCRIPTION OF THE DRAWINGS

Other features and advantages of the invention will appear more clearly upon reading the following detailed description, with reference to the annexed drawings, in which.

DETAILED DESCRIPTION OF PREFERRED EMBODIMENTS

Figure 1:
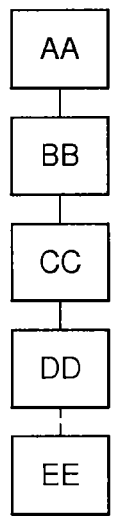
FIG. 1 shows a schematic flow chart of the series of operations for implementation of the method.

The invention proposes to implement a method for obtaining, in an economical manner and with high dimensional precision, transparent, one-piece timepiece components 1 bearing decorations or inserts on two opposite faces.

More particularly, it is an object of the invention to produce a component 1 of this type, with a higher surface hardness than that of the timepiece components usually obtained by moulding plastic materials.

The invention therefore concerns the development of a method for the making and decoration of a top surface 2 and a bottom surface 3 of a timepiece component 1 separated by the thickness of said component 1, and in a particular and preferred manner, of a transparent timepiece component 1 for a movement 100 or for a timepiece 1000.

According to the method and in this order, the following steps are performed:

AA: a first decoration A is deposited on a male pattern 9;
BB: the male pattern 9, which may or may not be covered with a preform 6, is moved into an injection chamber 11, a transparent material 13 is injected therein to coat male pattern 9 or preform 6 to obtain a compound B including top face 2, with first decoration A, on the bottom face 3 of said compound B, which is opposite to said top face 2, which is produced by moulding in injection chamber 11, or preform 6, or overmoulding preform 6 in injection chamber 11;
CC: compound B is polymerised in injection chamber 11 and then removed therefrom;
DD: another material 15 and/or second decoration C is deposited in a cavity 16 where said other material 15 and/or said second decoration C is held by gravity, and is deposited, on top face 2, by a relative motion in the direction of gravity, so as to obtain a second compound 18.

Preferably, this method is implemented in a production means having multiple stations, in which:

in a first station 8, a first decoration A is deposited on a male pattern 9;
there is moved into a second station 10, in an injection chamber 11 complementary to said top surface 2, either male pattern 9 provided with first decoration A, or respectively male pattern 9 provided with first decoration A covered with a transparent preform 6 in first station 8 or in an intermediate station between first station 8 and second station 10, and a first transparent polymerisable material 13 is injected throughout injection chamber 11, so as to coat with first material 13, either male pattern 9 provided with first decoration A, or respectively, overmoulded male pattern 9 provided with first decoration A covered by preform 6, so as to obtain a first compound B including top face 2 and including first decoration A on hollow bottom face 3;
the first compound B is left to polymerise in injection chamber 11,
the first compound B is removed from injection chamber 11;
a third material 15 and/or a second decoration C is deposited in a cavity 16 in a third station 17 where third material 15 and/or second decoration C is held by gravity;

in a third station 17, third material 15 and/or second decoration C is deposited on top surface 2 of first compound B by a relative motion between cavity 16 and third station 17 in the direction of gravity, so as to obtain a second compound 18;

in third station 17, it is waited until second compound 18 is handleable;

the second compound is removed from third station 17.

Figure 2:
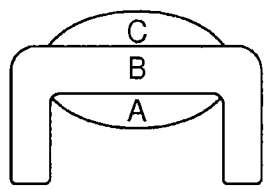
FIG. 2 shows a schematic cross-section through the thickness of a component obtained according to the method, in an embodiment wherein a decoration is affixed to the bottom face and another decoration is affixed to the top face thereof.
Figure 3:
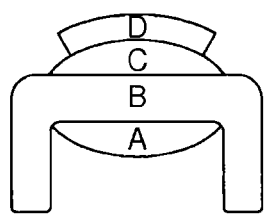
FIG. 3 shows a schematic cross-section through the thickness of a component obtained according to the method, in an embodiment wherein a decoration is affixed to the bottom face and several decorations are affixed in superposition to the top face thereof.
Figure 5:
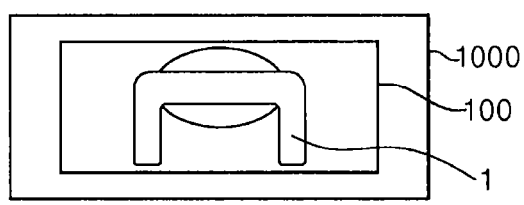
FIG. 5 shows block diagrams of a timepiece including at least one component made according to the invention.
Figure 4E:
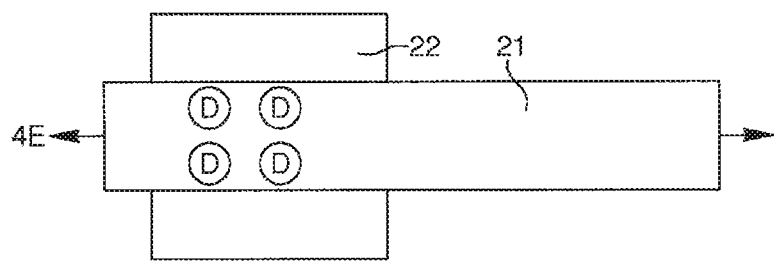
FIGS. 4A-4E show schematic views of a production unit including various stations around a rotating tool, each corresponding to a step for implementing the method according to the invention.
Figure 4D:
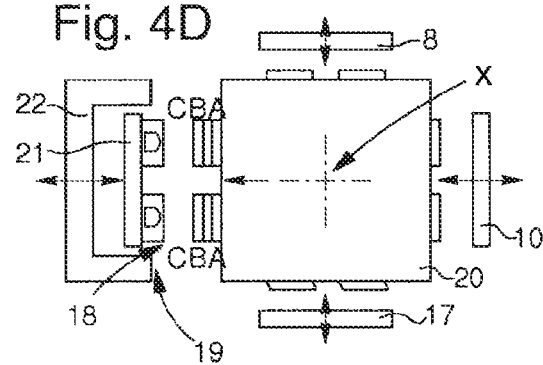
Figure 4A:
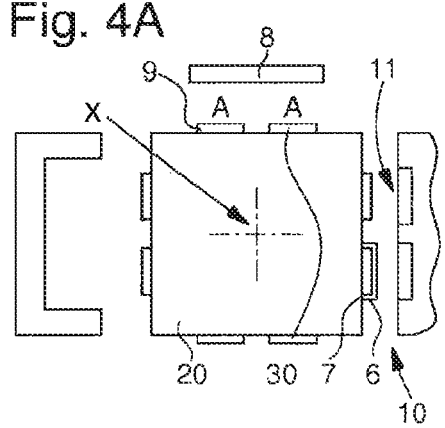
Figure 4B:
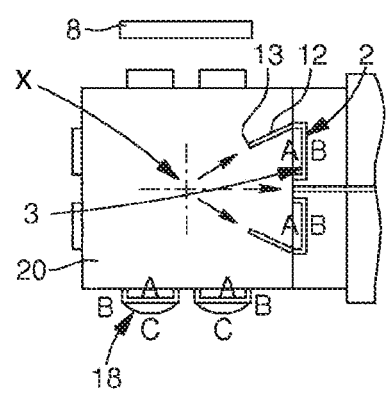
Figure 4C:
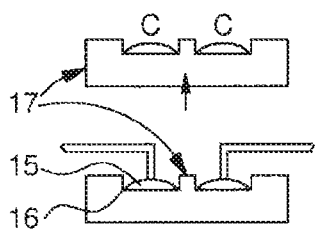

This mode of operation makes it possible to obtain a component according to FIG. 2.

In a particular manner, allowing the combination, in proximity to top face 2, of different technical and/or decorative functions, in a step EE, after the removal of second compound 18 from third station 17, in a fourth station 19, a third decoration D is deposited on top face 2 of second compound 18 or in superposition on third material 15 and/or second decoration C. Said third decoration D may be moved by a slide element 21 movable relative to a frame 22.

Generally, first material 13 includes at least acrylic monomers, at least one thermal initiator, at least one UV initiator and at least one cross-linking agent which may be formed by at least one of the acrylic monomers. It may also include one or more additives, which will be detailed below.

More specifically, this first material 13 includes a mixture of acrylic monomers including at least one monomer having a functionality greater than or equal to 2, at least one thermal initiator, and and at least one photochemical initiator. Here too, the material may include one or more additives.

Even more specifically, this first material 13 includes, as a proportion of the total:
- a mixture of acrylic monomers having a functionality greater than or equal to 2:50-97.5%
- at least one thermal initiator: 0.5-3%
- at least one photochemical initiator: 0.5-3%
- at least one additive: 0-50%.

In an even more specific composition, this first material 13 includes, as a proportion of the total:
- a mixture of trimethylolpropane tri (methacrylate) and pentaerythrityl tetraacrylate: 50-97.5%
- bis(4-tert-butylcyclohexyl) peroxydicarbonate: 0.5-1.5%
- 1-benzoylcyclohexanol: 0.7-2.3%
- at least one additive 0-50%

In a preferred composition, which will be referred to hereinafter as model composition CT, this first material 13 includes, as a proportion of the total:
- trimethylolpropane tri (methacrylate): 78.0%
- pentaerythrityl tetraacrylate: 19.5%
- bis(4-tert-butylcyclohexyl) peroxydicarbonate: 0.5%
- 1-benzoylcyclohexanol: 2.0%

As regards those compositions of first material 13 which include additives, which are within a range of 0-50% of the total of first material 13, these additives may include, as a percentage of the total of said first material 13:

a. Antistatics:
  a. Copolymer polyamide-polyether: 0-15% preferably from 10-15%
  b. Ethylenic ionomer resin: 0-30% preferably from 10-30%
  c. Trineoalkoxy Zirconate: 0-30% preferably from 10-30%
b. Conductors:
  a. Conductive nanoparticles: gold, carbon nanotubes, silver, antimony tin oxide alloy, zinc aluminium oxide alloy, indium tin oxide alloy, zinc gallium oxide alloy: 0-30% preferably from 10-30%
c. Magnetics:
  a. Magnetic nanoparticles: magnetite: 0-30% preferably from 5-30%
d. Antibacterials
  a. Silver ions: 0-30% preferably from 10-30%
e. Anti-UV:
  a. Absorbers: benzotriazole: 0-0.2% preferably from 0.05-0.2%
  b. HALS (Hindered Amine Light Stabilizers): 0-0.02% preferably from 0.05-0.2%
f. Antioxidants:
  a. Phenolic phosphite; ethylene bis [3,3-bis(3-tert-butyl-4-hydroxyphenyl) butyrate]; pentaerythritol tetrakis (3-(3,5-di-tert-butyl-4-hydroxyphenyl)propionate): 0-1.5%
g. Fire retardants:
  a. Phosphorus derivative: triphenyl phosphate 0-15%
  b. Exfoliated montmorillonite: 0-15%
  c. Clay nanotubes: 0-15%
h. Lubricants:
  a. Silicone acrylate: 0-2% preferably from 0.5-2%
i. Colorants:
  a. Anthraquinones: 0-50%
  b. Azoics: 0-50%
j. Pigments: 0-50%
k. Adjuvants with controlled delivery: incorporated in the formulation, these adjuvants are gradually released into the operating environment: 0-50%
l. Microcapsules of repair agent, formed of polymerisable liquid of the same nature as the composition concerned, in particular in a model composition CT, the content then being incorporated in the total content: 0-50%

Preferably, and particularly advantageously due to its multiple physical properties of fluidity and capillarity in the fluid state, high surface hardness in the polymerised state, and perfect transparency, a material having model composition CT or the Cover Form® material by Evonik Rohm® is used as first material 13. Cover Form® is derived from the combination of two components: a liquid reactive referenced 30A and a liquid initiator referenced 30B.

The choice of third material 15 may be made from among the compositions retained for first material 13, and in particular a material having model composition CT may be chosen.

Preferably, when a preform 6 is used, said preform 6 is made in a first preform material 7 formed by a material from the acrylic polymer family, or by a material chosen from among the compositions retained above for first material 13, or having model composition CT, or formed by the Cover Form® material by Evonik Rohm®, or by methyl polymethacrylate, or the Nanocryl® material by Hanse Chemie®.

The choice of first material 13 is the deciding factor for the resistance of the component 1 concerned. Indeed, some materials are specifically devised for surface coatings, but with a thickness of less than 50 µm, it is not always possible to apply these materials to the making of complete timepiece components. The preferred choice of using a material having model composition CT or the Cover Form® material either as first material 13, or as first preform material 7, in a range of thickness which may be much larger, by several millimetres for watch glasses, is not self evident and is the result of a long series of tests. Naturally, shrinkage is significant with these thicknesses, and the associated moulds must be sized accordingly.

Preferably, in the case where component 1 is made, in injection chamber 11, without using a preform, and more particularly in the case where component 1 is thin, namely having a thickness of several hundredths or tenths of a millimetre, first material 13 is advantageously injected into injection chamber 11 through an injection and degassing capillary network 12.

Advantageously, the polymerisation of first compound B in injection chamber 11 is accompanied by a heat treatment at less than 130° C., preferably between 100° C. and 120° C. for 10 to 20 seconds, and/or by irradiation by UV radiation, so as to increase the superficial hardness of component 1. This natural polymerisation may be accompanied by a heat treatment H, and/or irradiation J by ultraviolet (hereinafter "UV") radiation, which each have the effect of increasing the surface hardness of the component 1 obtained, by permanently cross-linking the system. Irradiation provides a significant increase in hardness, of around 10% compared to the same component polymerised at ambient temperature, or polymerised by heat, and in this latter case, increasing a surface hardness that is already higher than that of the same component polymerised at ambient temperature. The preferred implementation of the invention includes UV irradiation which makes it possible to activate the photochemical initiator of first material 13 and/or of preform material 7, depending on the case, formed of model composition CT or Cover Form®, so as to react, otherwise the mechanical properties of the finished component 1 are weaker.

It is clear that it is possible to carry out a complementary heat treatment and/or irradiation both when first compound B is confined inside the cavity of injection chamber 11, and when it is removed therefrom. The duration of an injection and polymerisation cycle with heating is brief, around 30 to 40 seconds. The UV irradiation cycle has a duration of 10 to 20 seconds.

In a preferred embodiment, polymerisation by heating is performed when component B is still inside the mould, the choice to perform UV irradiation inside or outside of the mould essentially depends on the constraints of the production cycle: in one case the moulding equipment is immobilised slightly longer prior to shaping the following component, in the other case additional handling is required, or irradiation may be continued in one of the following stations 17 or 19 of the production line. In an advantageous variant, cooling to ambient temperature is carried out at least as abruptly as the heating, for a duration of less than 20 seconds.

Although the preferred object of the invention is to form transparent compounds, it is also possible to form compounds with inclusions of a decorative or technical nature, for example the display guide-marks for the hour markers, which may be made in the thickness of a watch crystal, or on the side of the crystal facing the hands or display means of the timepiece, or the marks of ranges corresponding to particular displays, such as the power reserve or similar. Particular inserts may be incorporated, such as anti-counterfeiting marks, part identification numbers, energy or force sensors, or suchlike.

Advantageously, when a multi-layered compound is formed, functionalization structuring is performed on one or more of the intermediate surfaces between the layers.

A particularly advantageous variant of an inclusion of a technical nature for components 1 intended to form part of a timepiece movement consists in providing striae, mortises, pouches or cavities when mechanical functionalization structuring is performed on an intermediate surface of this type, to enable the deposition therein of particles having particular properties prior to the application of the top layer. The properties of the material having model composition CT or of the Cover Form® material in the liquid state prior to polymerisation allow advantage to be taken of its capillarity, when it is mixed with these particles, to deposit the particles at the bottom of the mortises or similar. Very precise dimensioning of the mortises, striae, cavities, pouches or similar, and close to the particle size of the particles, makes it possible to retain particles of small particle size during injection of the liquid product intended to form the following layer, in a perfectly defined position.

More specifically, the choice of insertion of electrified or electrifiable and/or magnetised or magnetisable particles confers on the component 1 thereby formed particular properties of physical attraction and/or repulsion with other components of a timepiece movement, having complementary properties according to the desired effect.

Thus, in an advantageous variant, during execution of the method according to the invention, these particles are integrated, either in proximity to bottom face 3, or in proximity to top face 2. Different variants may be combined if necessary.

According to a variant, electrifiable or magnetisable or electrified or magnetised particles are incorporated in first decoration A.

According to another variant, electrifiable or magnetisable or electrified or magnetised particles are incorporated in third material 15 and/or second decoration C.

According to another variant, electrifiable or magnetisable or electrified or magnetised particles are incorporated in first decoration A and/or second decoration C.

According to another variant, electrifiable or magnetisable or electrified or magnetised particles are incorporated in third decoration D.

The invention also concerns a production unit for implementing this method. At least a first station 8, at least a second station 10, at least a third station 17 are distributed in sequence in that order, around a rotating tool 20 carrying at least as many male patterns 9 as there are stations, and the peripheral stations are each movable around said rotating tool 20. As seen in FIG. 4, rotating tool 20 preferably pivots about a horizontal axis X, and each of the peripheral stations 8, 10, 17, 19 is movable in a paraxial to-and-fro motion, so as to release the peripheral stations to allow rotating tool 20 to pivot to move blanks to the next operation, the return of the peripheral stations onto the faces of rotating tool 20, represented here in the preferred form of a cube, then allows each of the individual operations to be carried out simultaneously. Thus, after one complete revolution, component 1 is finished. The removal of component 1 may advantageously be paired with the placing of the last decoration D, and be carried out fourth station 19. It may also be carried out by a manipulator in first station 8, the manipulator arm both removing the finished product from the primary tool 30 and providing said primary tool 30 with a first decoration A and/or a preform 6.

In a variant of the production unit for implementing the method, primary tools 30, each provided with at least one male pattern 9, are distributed around a said rotating tool 20 carrying at least one first station 8, at least one second station 10, at least one third station 17 in sequence in that order, in equal numbers, the number of stations being less than or equal to the number of primary tools 30.

Advantageously, rotating tool 20 includes a rotating central body in the form of a polyhedron, a cube or a rectangular prism in the case of FIGS. 4A to 4D. In a preferred embodiment in the case where one of the stations performs gravity deposition of material, tool 20 includes one station, station 17 here in FIGS. 4D and 4C, which is located underneath pivot axis X, so that a material of this type, in this case third material 15 and/or second decoration C, is discharged simply by gravity in liquid or paste or powder phase into a cavity 16. This application station for liquid or similar materials is a significant advantage of the invention.

The invention further concerns a timepiece movement 100 including at least one transparent timepiece component 1 and affixed decorations on both sides of component 1, on top surface 2 and hollow bottom surface 3 separated by the thickness of component 1 made and decorated according to the method.

The invention further concerns a timepiece 1000 including at least one transparent timepiece component 1 and affixed decorations on both sides of component 1, on top surface 2 and hollow bottom surface 3 separated by the thickness of component 1 made and decorated according to the method.

The invention claimed is:

1. A method for making and decorating a transparent timepiece component and for affixing decorations on both sides of the component, on a top surface and hollow bottom surface separated by a thickness of the component, the method comprising, in the following order:
    in a first station, depositing a first decoration on a male pattern;
    moving into a second station, in an injection chamber complementary to the top surface, either the male pattern provided with the first decoration, or respectively the male pattern provided with the first decoration covered with a transparent preform in the first station or in an intermediate station between the first station and the second station, and injecting a first transparent polymerizable material throughout the injection chamber, to coat with the first material, either the male pattern provided with the first decoration, or respectively, overmolding the male pattern provided with the first decoration covered by the preform, to obtain a first compound including the top surface and including the first decoration on the hollow bottom surface;
    allowing the first material injected into the injection chamber to polymerize;
    removing the first compound from the injection chamber;
    depositing a third material and/or a second decoration in a cavity in a third station where the third material and/or second decoration is held by gravity;
    in the third station, depositing the third material and/or second decoration on the top surface of the first compound by a relative motion between the cavity and the third station in a direction of gravity, to obtain a second compound which is the component that is decorated;
    in the third station, waiting until the second compound is handleable; and
    removing the second compound from the third station.

2. The method according to claim 1, further comprising, after the removing the second compound from the third station, in a fourth station, depositing a third decoration on the top surface of the second compound or in superposition on the third material and/or second decoration.

3. The method according claim 2, wherein electrifiable or magnetizable or electrified or magnetized particles are incorporated in the third decoration.

4. The method according to claim 1, wherein a model composition is used as the first material, which includes, as a proportion of a total:
    trimethylolpropane tri (methacrylate): 78.0%,
    pentaerythrityl tetraacrylate: 19.5%,
    bis (4-tert-butylcyclohexyl) peroxydicarbonate: 0.5%,
    1-benzoylcyclohexanol: 2.0%.

5. The method according to claim 1, wherein the preform is made in a first polymerizable preform material formed by a material from the acrylic polymer family or by a material having a model composition which includes, as a proportion of a total:
    trimethylolpropane tri (methacrylate): 78.0%,
    pentaerythrityl tetraacrylate: 19.5%,
    bis (4-tert-butylcyclohexyl) peroxydicarbonate: 0.5%,
    1-benzoylcyclohexanol: 2.0%;
    or by methyl polymethacrylate.

6. The method according to claim 1, wherein the first material is injected into the injection chamber through an injection and degassing capillary network.

7. The method according to claim 1, wherein the polymerization of the first material is accompanied in the injection chamber by a heat treatment between 100° C. and 120° C. for 10 to 20 seconds, and/or irradiation by ultraviolet radiation.

8. The method according to claim 1, wherein the polymerization of the first material is accompanied, after the removing from the injection chamber, by irradiation by ultraviolet radiation.

9. The method according to claim 1, wherein electrifiable or magnetizable or electrified or magnetized particles are incorporated in the first decoration.

10. The method according to claim 1, wherein electrifiable or magnetizable or electrified or magnetized particles are incorporated in the third material and/or in the second decoration.

11. The method according to claim 1, wherein electrifiable or magnetizable or electrified or magnetized particles are incorporated in the first decoration and/or in the second decoration.

12. The method according to claim 1, wherein the component is a watch glass.

* * * * *